Kerr Jr. & Robbins.
Fountain Comb.

N° 85311

Patented Dec. 29, 1868

Witnesses.
Geo. A. Loring
Edward Griffith

Inventor.
Wm Kerr Jr. & J. A. Robbins
by their Attorney
Frederick Curtis

United States Patent Office.

WILLIAM KERR, JR., AND JOSEPH A. ROBBINS, OF BOSTON, MASSACHUSETTS.

Letters Patent No. 85,311, dated December 29, 1868.

IMPROVED FOUNTAIN-COMB.

The Schedule referred to in these Letters Patent and making part of the same.

*To all to whom these presents shall come:*

Be it known that we, WILLIAM KERR, Jr., and JOSEPH A. ROBBINS, of Boston, in the county of Suffolk, and State of Massachusetts, have made an invention of a new and useful Liquid-Holding or Fountain-Comb, for dyeing or oiling the hair, as well as for various other purposes; and do hereby declare the following to be a full, clear, and exact description thereof, due reference being had to the accompanying drawings, making part of this specification, and in which—

Figure 1:
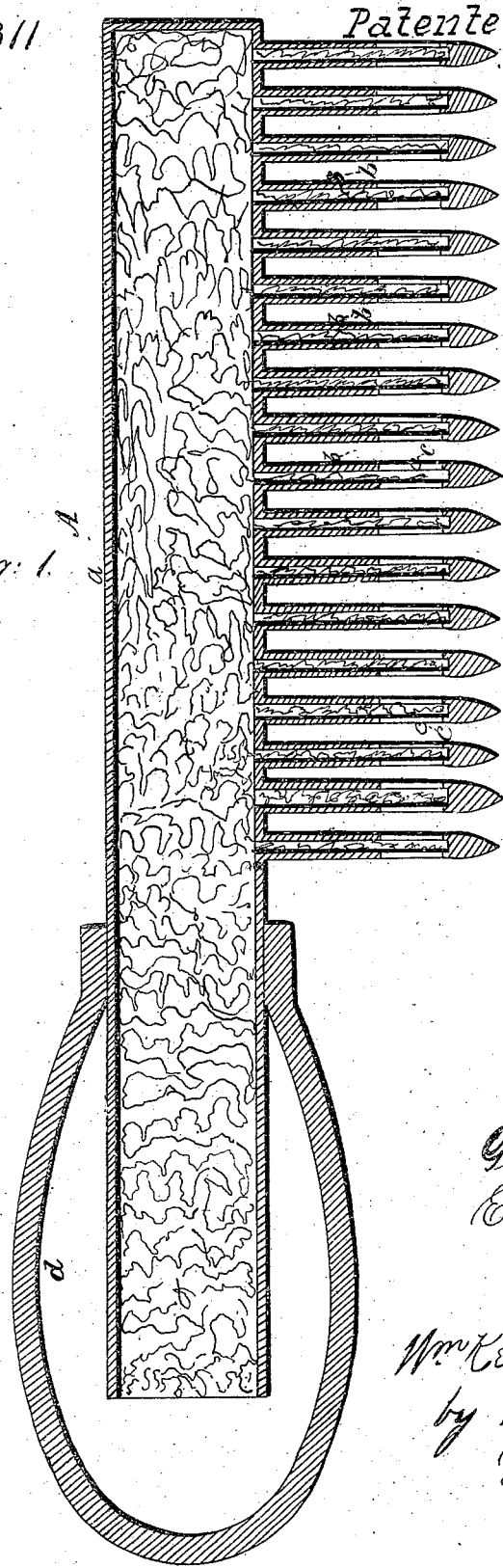

Figure 1 is a longitudinal section, and

Figure 2:
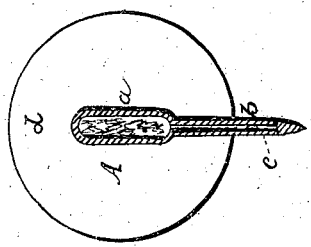

Figure 2, a transverse section of a comb constructed as contemplated in our invention.

The object of this invention is to enable the operation of dyeing, and also of oiling or dressing the human hair, to be performed in an expeditious manner, and with great neatness and cleanliness, as well as more thoroughly and perfectly than is now done; at the same time, to dispense with many of the utensils now employed for the purpose.

The invention consists in making the comb hollow, and capable of containing liquid, the teeth being foraminous or punctured, in order to allow such liquid to ooze from them in small quantities, and, when drawn through the hair, to deposit such liquid upon and through it, the body or back of such comb being provided, at one end, with an elastic bulb, for filling it, and for expelling the liquid therefrom, in manner similar to that of ordinary enema-syringes.

In the drawings, above referred to as illustrating our invention, A denotes a comb, made substantially in the ordinary form of such articles, with the exception that its back, *a*, as well as its teeth, *b b*, &c., are hollow, for the purpose of containing liquid.

The inner sides of the teeth are punctured with one or more minute orifices or slots, *c c*, &c., while the back of the comb, at one end, which is open, is provided with an elastic bulb, *d*, of a shape similar to that of an ordinary enema-syringe bulb.

The interior of the back and teeth is preferably to be filled or packed with wool, cotton, or other equivalent or suitable material, to prevent too rapid escape of fluid.

The operation of the above-described implement is very simple, and will recommend itself to any intelligent person.

The bulb is to be compressed by the hand, and the comb immersed in the liquid, whether such liquid be a dye, oil, or dressing-compound, and the pressure upon the bulb subsequently released, which will fill the interior of the comb, through the orifices *c c*, with the liquid.

The comb is now to be passed through the hair or other substance upon which the contents of the comb are to be discharged, the bulb being, at the time, compressed with more or less force, according to the amount of material to be deposited.

The liquid oozes from the orifices of the teeth of the comb in a manner perfectly calculated to cause it to thoroughly permeate and incorporate itself with the mass of hair, or other substance to which it is applied, one great advantage of our invention being the fact that none of the liquid can come in contact with the skin of the user, either of the hands or face, the value of which will manifest itself to every one having occasion to use hair-dyes.

The invention, although referred to above as being valuable for dyeing or dressing human hair, will be found susceptible of various useful applications.

It will be evident that the filling of the comb with liquid may be performed at other points than at the orifices of the teeth, and also that means other than the elastic bulb may be employed for filling and emptying the comb, without affecting the character of our invention, the main condition of which consists in constructing the back and teeth, especially the latter, hollow, for the purpose of containing liquid.

We claim as our invention, and desire to secure by Letters Patent—

1. As an improved article of manufacture, a comb whose teeth are hollow, and capable of containing liquid, for the purpose substantially as before explained.

2. A comb, having its body and teeth hollow, and with the latter foraminous or punctured, in order to allow of escape of liquid therefrom, in manner and to operate essentially as herein shown and described.

3. In combination with a comb, the body and teeth of which are hollow, an elastic bulb, or its equivalent, for the purpose of filling and emptying such comb of its liquid contents, substantially as hereinbefore explained.

WILLIAM KERR, JR.
JOSEPH A. ROBBINS.

Witnesses:
GEO. E. PUTNEY,
FRED. CURTIS.